United States Patent [15] 3,677,359
Gray [45] July 18, 1972

[54] AIR CUSHION VEHICLE
[72] Inventor: Dan E. Gray, Calgary, Alberta, Canada
[73] Assignee: Shair of Canada Limited, Vancouver, Canada
[22] Filed: June 5, 1970
[21] Appl. No.: 43,840

[52] U.S. Cl. ............................................180/121, 180/127
[51] Int. Cl. ........................................B60v 1/14, B60v 1/16
[58] Field of Search..................180/121, 120, 117, 118, 122, 180/126, 127

[56] References Cited

UNITED STATES PATENTS

| 3,150,732 | 9/1964 | Walker | 180/122 |
| 3,259,097 | 7/1966 | Van Veldhuizen et al. | 180/126 UX |
| 3,263,764 | 8/1966 | Bertin | 180/121 |
| 3,339,655 | 9/1967 | Guienne | 180/127 |
| 3,382,945 | 5/1968 | Bertin et al. | 180/121 |
| 3,388,766 | 6/1968 | Bertin | 180/127 |
| 3,463,263 | 8/1969 | Winter | 180/117 |
| 3,373,837 | 3/1968 | Guienne | 180/121 |

Primary Examiner—A. Harry Levy
Attorney—Fetherstonhaugh & Co.

[57] ABSTRACT

A ground effect machine in which the skirt is divided into a plurality of rearwardly directed and separate compartments so as to be less vulnerable to damage and to obtain thrust from the air issuing from the skirt.

3 Claims, 5 Drawing Figures

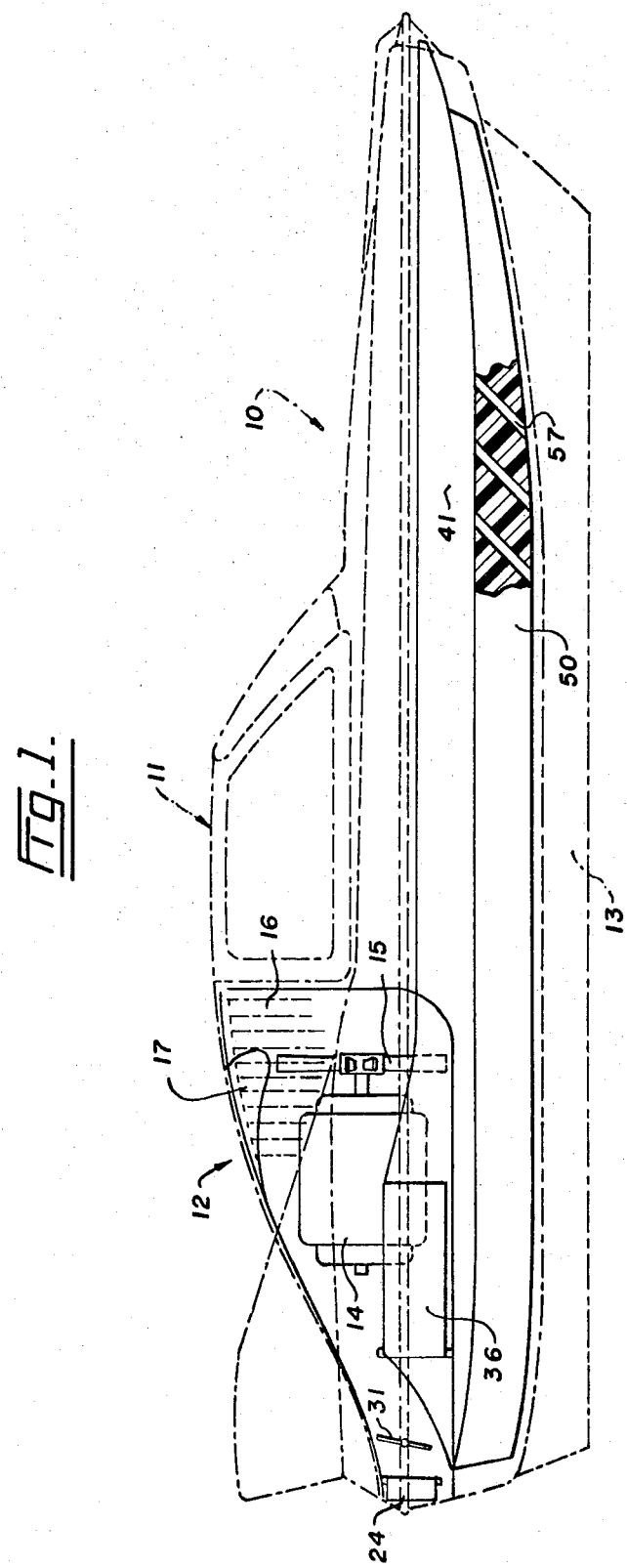

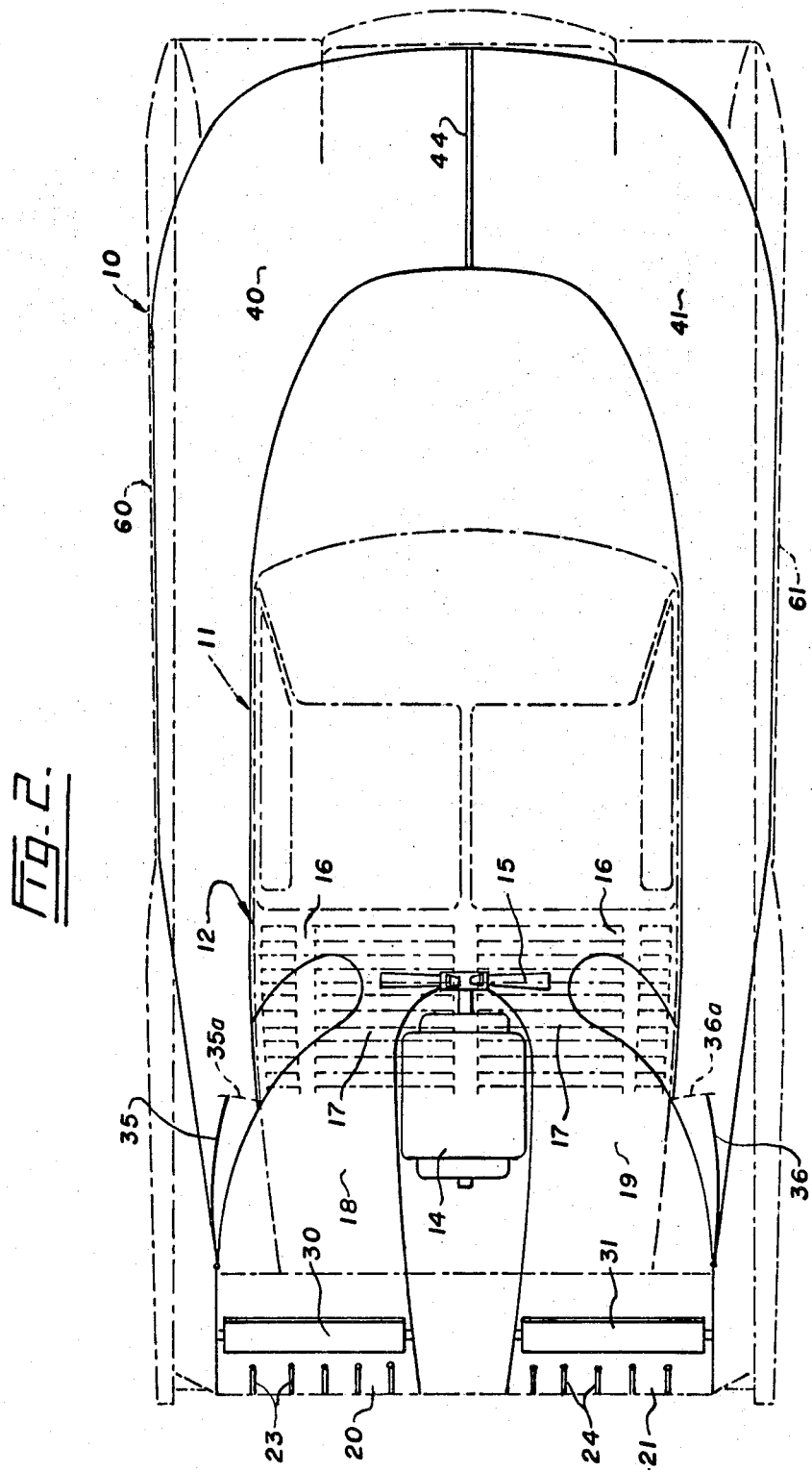

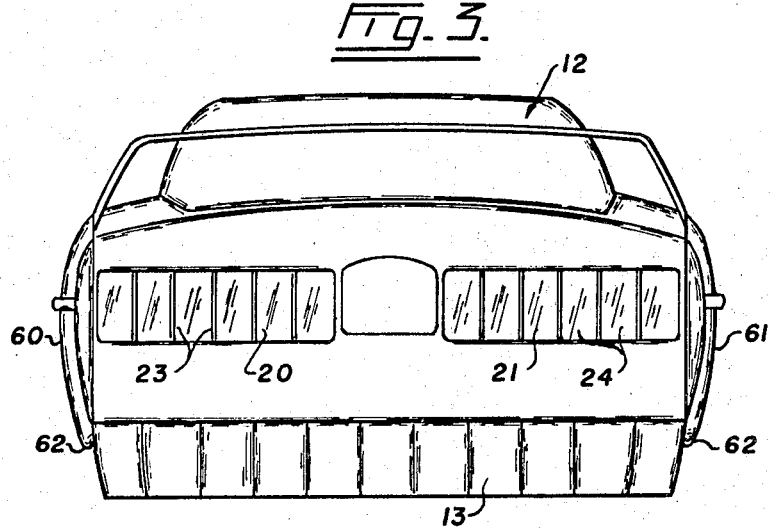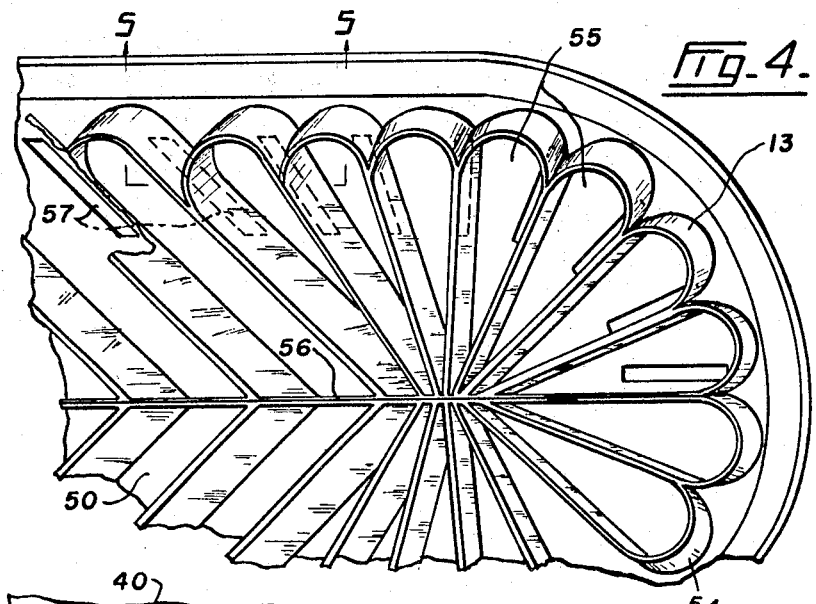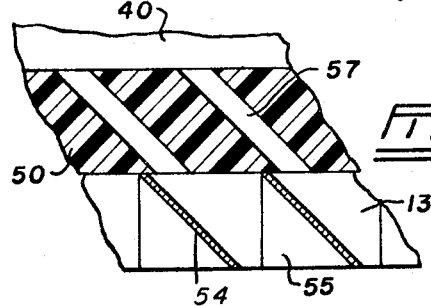

AIR CUSHION VEHICLE

This invention is concerned with ground effect vehicles that is to say vehicles which are supported upon a cushion of air which issues from a plenum chamber and is bound by a flexible skirt. These machines are otherwise known as hovercraft or air cushion vehicles.

These machines commonly have a compressor or fan which supplies air to the plenum chamber to support the vehicle and a separate drive means to propel the vehicle such as an air screw.

This invention seeks to provide such a vehicle in which the susceptibility to damage of the skirt is lessened. It also seeks to provide a vehicle in which the skirt and the air cushion serves as well as the purpose of supporting the vehicle, also the purpose of steering. It also seeks to provide such a vehicle in which propulsion is derived from the skirt pressure either alternatively to external means or additionally to those means.

From one aspect according to this invention there is provided a ground effect vehicle in which the skirt is made up of a plurality of separate and contiguous compartments so that in the event of damage to the skirt only the air pressure from the damaged compartments is lost while the other compartments continue to function independently.

From another aspect there is provided a ground effect machine with a plurality of compartments each of which is defined at least in part by a downwardly and rearwardly sloping wall to impart to the air passing through that compartment a component of movement in the rearward direction of travel of the vehicle thus to propel the vehicle.

From another aspect this invention provides a ground effect machine in which the skirt is made up of a plurality of compartments, the compartments being divided into a port and starboard series and means for varying the supply of air to the two skirts independently to assist in steering.

An embodiment of this invention is illustrated, schemmatically, in the accompanying drawings in which, FIG. 1 is a side view of the vehicle according to this invention, FIG. 2 is a plan view of the vehicle of FIG. 1, FIG. 3 is an end view of the vehicle of FIG. 1, FIG. 4 is a view of a part of the underside of the vehicle in FIG. 1, and FIG. 5 is a section on the line 5—5 of FIG. 4.

The outline of the vehicle is shown in FIGS. 1 and 2 only in chain line so that interior parts of the vehicle can be seen. The vehicle comprises a body generally indicated at 10, a passenger or goods carrying compartment at 11, an engine compartment indicated generally at 12 and a skirt indicated generally at 13.

The passenger or load carrying compartment, engine and body of the vehicle are generally ancilliary to the present invention and as such are not described in detail herein. However, it will be appreciated that the embodiment of the invention is illustrated in a small passenger vehicle and it is in this field that the present invention will find its principal application.

The engine 14 is located rearwardly of the load carrying compartment of the vehicle and is arranged to drive a fan 15 or other compressor. Intake ducting 16 extends from openings in the body skin to the low pressure side of the fan. At the high pressure side of the fan there is ducting 17 forming two passages or ducts 18 and 19 one to each side of the motor 14 and which extend generally rearwardly of the vehicle. The ducts 18 and 19 terminate respectively in rearwardly directed outlets 20 and 21 and vanes 23 and 24 are associated with the outlets to direct air issuing from them to right or left of the longitudinal fore and aft axis of the vehicle. The vanes 23 and 24 conveniently are operated by a common mechanism linked to a steering wheel or lever in the passenger compartment.

Between the outlets 20 and 21 and the fan there are valve members 30 and 31 located respectively in the ducts 18 and 19. These valve flaps are shiftable from the position shown in FIG. 1 in which they substantially prevent the passage of air therepast through the ducts, to a position in which they freely allow the passage of air.

Between the flaps 30 and 31 and the fan there are located doors 35 and 36 in the ducts 18 and 19 respectively. The doors 35 and 36 are movable over the arcs 35a and 36a shown in the drawings to connect the ducts 18 and 19 to ducts indicated at 40 and 41 which constitute the two plenum chambers of the invention and which each extend from a common wall 44 rearwardly around the periphery of the vehicle. It will be appreciated that by opening the doors 35 and 36 to a greater or lesser extent the air pressurized by the fan 15 can be divided between streams issuing from the rear of the vehicle through the outlets 20 and 21 and streams passing through the two plenum chambers.

The plenum chamber is visible in FIG. 1 and it will be seen that it has a base 50 formed of a buoyant material and of substantial thickness. The base 50 is common to both plenum chambers 40 and 41. Conveniently it is formed as a reinforced plastic tank filled with a rigid foamed plastics material such as polyurethane.

Secured to the underside of and depending from, the base 50 is the flexible skirt 13. The skirt is formed of separate and contiguous compartments 55 which are defined by tough resilient walls 54 of rubber or rubber-like material. The compartments cover substantially the whole of the base of the plenum chambers.

As can be seen in FIG. 4 the compartments towards the bow or front of the vehicle radiate from a point on the fore and aft axis of the vehicle and those located along the sides of the vehicle extend from a central partition 56, rearwardly, towards the side edges of the vehicle. The partition 56 effectively divides the compartments into two sets one to the starboard side of the fore and aft axis and the other to the port side of that axis. Each set is fed with air from the associated one of the plenum chambers 40 and 41.

The base of the plenum chambers are formed with rearwardly directed slots 57 there being one slot to each compartment. The slots slope rearwardly from top to bottom to impart to air passing therethrough from the plenum chamber, a rearward component of movement.

As can be seen particularly in FIG. 5 of the drawings the walls defining the compartments and extending generally transversely of the vehicle are inclined rearwardly from top to bottom. In this way the rearward component of movement of air issuing through the slots in the base of the plenum chamber is continued through the skirt so that air issues from the skirt to atmosphere in a rearward direction thus imparting forward thrust to the vehicle.

It will be appreciated that the vehicle according to the present invention is capable of riding over water or rough terrain and it is preferred, to assist in propulsion through the water, to provide a largely conventional outboard motor to be located between the outlets 20 and 21 of the ducts 18 and 19.

The vehicle of the present invention has many desirable characteristics. If the skirt is damaged then the air from the skirt is lost only from those compartments which are torn and only in cases of extensive damage will the skirt pressure be unable to support the vehicle. In such a case of extensive damage and if the vehicle is on water then by closing the doors 35 and 36 all of the air compressed by the fan 15 may be directed rearwardly through the outlets 20 and 21 of ducts 18 and 19 to propel the vehicle even if no outboard motor is provided or that outboard motor is inoperative.

Steering can be effected by the vanes in the outlets 20 and 21 and additionally the doors 35 and 36 can be independently operated to reduce the pressure in the associated plenum chamber and the thrust obtained at that side of the vehicle through the skirt so that the steering operation is assisted in this fashion.

Conveniently the side walls 60 and 61 of the body are extended downwardly as at 62 beyond the upper edges of the skirt so that when the vehicle is at rest it is supported on the lower marginal edges of the longitudinal side walls of the vehicle body and the skirt may collapse into the space bound by those edges thus to be protected from damage.

I claim:

1. An air cushion vehicle comprising a base, two separated plenum chambers extending around the periphery of the vehicle above the base, a skirt below the base including a plurality of contiguous and separate compartments, a longitudinally extending and centrally disposed partition separating the compartments on one side of the vehicle from those on the other side; said compartments each having a wall, part of which slopes downwardly and rearwardly from the base; said base having a downwardly and rearwardly directed slot connecting each compartment with a plenum chamber on the same side of the vehicle as said compartment, means for supplying pressurized air to the plenum chambers, and independently operable means for controlling the inflow of pressurized air into each of the plenum chambers.

2. An air cushion vehicle as claimed in claim 1, in which said walls of the compartments diverge from the partition to the periphery of the vehicle.

3. An air cushion vehicle as claimed in claim 1, and including duct means connecting the means for supplying pressurized air to the rear of the vehicle, said duct means terminating in rearwardly directed outlets located one on each side of the longitudinal axis of the vehicle, and means on each outlet for controlling the direction of the flow of air discharging therefrom.

* * * * *